US011789539B2

United States Patent
Orito (10) Patent No.: US 11,789,539 B2
(45) Date of Patent: Oct. 17, 2023

(54) DISPLAY

(71) Applicant: Mitsubishi Electric Corporation, Tokyo (JP)

(72) Inventor: Koichi Orito, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/800,901

(22) PCT Filed: May 29, 2020

(86) PCT No.: PCT/JP2020/021461
§ 371 (c)(1),
(2) Date: Aug. 19, 2022

(87) PCT Pub. No.: WO2021/240818
PCT Pub. Date: Dec. 2, 2021

(65) Prior Publication Data
US 2023/0117256 A1    Apr. 20, 2023

(51) Int. Cl.
*G06F 3/01*   (2006.01)
*G06F 3/041*  (2006.01)
*G09G 5/00*   (2006.01)

(52) U.S. Cl.
CPC ............ *G06F 3/016* (2013.01); *G06F 3/0416* (2013.01); *G09G 5/003* (2013.01); *G09G 2340/0407* (2013.01)

(58) Field of Classification Search
None
See application file for complete search history.

(56) References Cited

U.S. PATENT DOCUMENTS 9,746,923 B2   8/2017   Cruz-Hernandez et al.
9,898,903 B2   2/2018   Khoshkava et al.
(Continued)

FOREIGN PATENT DOCUMENTS

CN    107168512 A     9/2017
JP    2013-97764 A    5/2013
(Continued)

OTHER PUBLICATIONS

International Search Report and Written Opinion dated Jul. 7, 2020, received for PCT Application PCT/JP2020/021461, filed on May 29, 2020, 9 pages including English Translation.
(Continued)

*Primary Examiner* — Toan H Vu
(74) *Attorney, Agent, or Firm* — XSENSUS LLP (57) ABSTRACT

A display includes: a monitor that includes an input/output region and performs haptic feedback when detecting an input from an operator while an image is displayed, the input/output region being obtained by superimposing a first region for displaying an image, a second region including a plurality of input detection regions each for detecting an input from an operator, and a third region including a plurality of haptic feedback regions each for performing haptic feedback to the operator; and a data processor that determines a haptic output value in each of the plurality of haptic feedback regions on the basis of image data of an image being displayed on the first region and a detection result of an input from an operator in each of the plurality of input detection regions.

7 Claims, 6 Drawing Sheets

(56) References Cited

U.S. PATENT DOCUMENTS

| | | | | |
|---|---|---|---|---|
| 10,345,895 | B2* | 7/2019 | Greenberger | G06F 3/017 |
| 11,380,021 | B2* | 7/2022 | Nakata | A63F 13/211 |
| 2014/0078398 | A1* | 3/2014 | Shenoy | G06T 13/80 |
| | | | | 348/515 |
| 2014/0208204 | A1* | 7/2014 | Lacroix | G06F 3/041 |
| | | | | 715/702 |
| 2017/0010771 | A1* | 1/2017 | Bernstein | G09G 5/12 |
| 2017/0097807 | A1* | 4/2017 | Park | G06F 3/016 |
| 2019/0185021 | A1* | 6/2019 | Ono | B62D 15/029 |
| 2019/0370448 | A1* | 12/2019 | Devine | G06V 40/67 |
| 2020/0387214 | A1* | 12/2020 | Ravasz | G06F 3/0233 |
| 2021/0117152 | A1* | 4/2021 | Deisher | G06N 3/04 |
| 2022/0187919 | A1* | 6/2022 | Tang | G06F 3/0436 |
| 2022/0312109 | A1* | 9/2022 | Misawa | G06F 3/016 |
| 2022/0342972 | A1* | 10/2022 | Van Os | G06V 40/172 |

FOREIGN PATENT DOCUMENTS

| | | |
|---|---|---|
| JP | 2017-162468 A | 9/2017 |
| JP | 2018-128725 A | 8/2018 |
| JP | 2019-23892 A | 2/2019 |

OTHER PUBLICATIONS

Decision to Grant dated Dec. 1, 2020, received for JP Application 2020-546517, 5 pages including English Translation.

Office Action dated Jul. 5, 2023 in corresponding Chinese Patent Application No. 202080101355.3, and computer-generated English machine translation of summary thereof, 8 pages.

* cited by examiner

DISPLAY

CROSS-REFERENCE TO RELATED APPLICATION

The present application is based on PCT filing PCT/JP2020/021461, filed May 29, 2020, the entire contents of which are incorporated herein by reference.

FIELD

The present disclosure relates to a display having a haptic feedback function.

BACKGROUND

Patent Literature 1 describes, as a display of a mobile phone or the like, a display including a touch-sensitive interface and an actuator, in which when the touch-sensitive interface detects that a user has contacted an image being displayed, the actuator outputs a haptic effect with an intensity corresponding to a color of a portion of the image where the contact has been detected.

CITATION LIST

Patent Literature

Patent Literature 1: Japanese Patent Application Laid-open No. 2019-023892

SUMMARY

Technical Problem

In the display described in Patent Literature 1, a haptic value and a haptic intensity to be fed back to the user are assigned to the intensity of color of each pixel of the image. However, a resolution at which the display described in Patent Literature 1 performs haptic feedback exceeds a resolution identifiable by humans, and thus the user receives feedback in which a plurality of values are mixed. That is, the feedback received by the user is feedback similar to that in a case of touching a monochrome image, and in a case where a gradational image is displayed, the user cannot identify the gradation therein and may erroneously recognize the image as a monochrome image, which is a problem.

The present disclosure has been made in view of the above, and an object thereof is to obtain a display that realizes haptic feedback capable of preventing erroneous recognition by an operator in a case where an image with gradation is displayed.

Solution to Problem

To solve the above described problems and achieve the object a display according to the present disclosure includes a monitor adapted to perform haptic feedback when detecting an input from an operator while an image is being displayed, the monitor including: a first region adapted to display an image; a second region including a plurality of input detection regions each adapted to detect an input from an operator; and an input/output region being obtained by superimposing a third region including a plurality of haptic feedback regions each adapted to perform haptic feedback to the operator. The display also includes a data processor adapted to determine a haptic output value in each of the plurality of haptic feedback regions on a basis of: image data of an image being displayed on the first region; and a detection result of an input from an operator in each of the plurality of input detection regions.

Advantageous Effects of Invention

A display according to the present disclosure achieves an effect of realizing haptic feedback capable of preventing erroneous recognition by an operator in a case where an image with gradation is displayed.

DESCRIPTION OF EMBODIMENTS

Hereinafter, a display according to an embodiment of the present disclosure will be described in detail with reference to the drawings.

Embodiment

Figure 1:
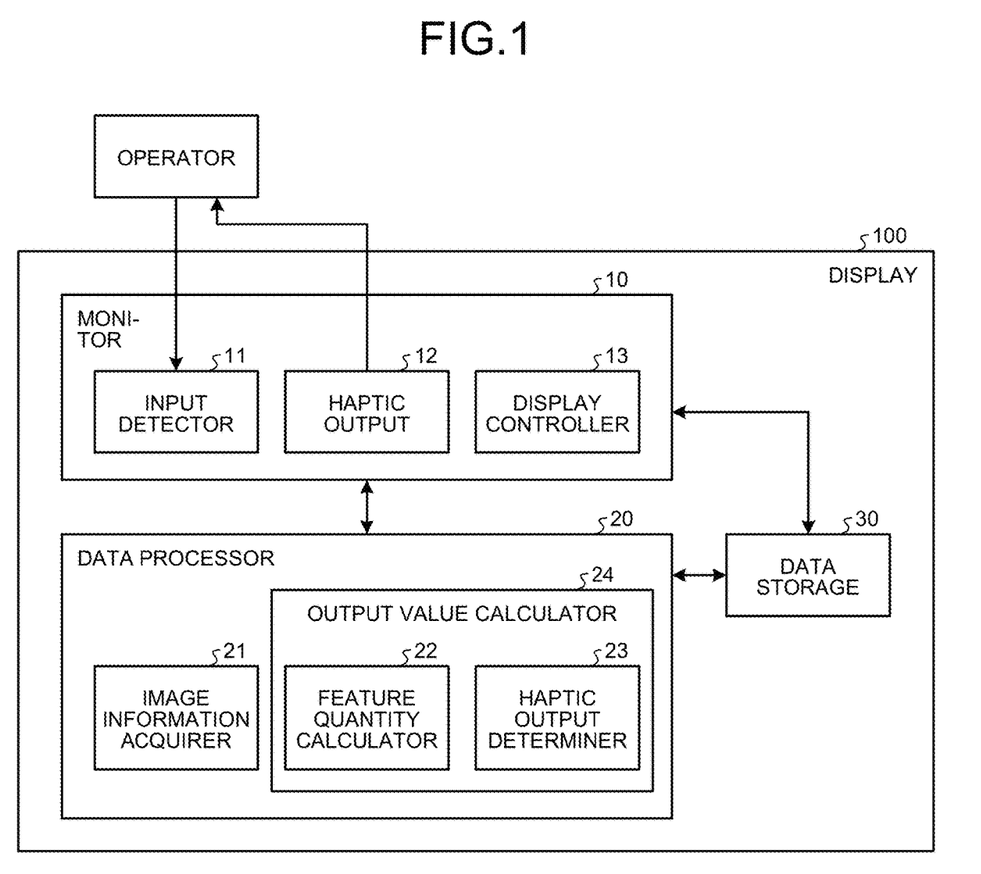
FIG. 1 is a diagram illustrating an example of a functional block configuration of a display according to an embodiment.

FIG. 1 is a diagram illustrating an example of a functional block configuration of a display according to an embodiment. A display 100 according to the present embodiment includes: a monitor 10 that performs display of an image and the like; a data processor 20 that performs various data processes necessary for an operation of the monitor 10; and a data storage 30 that stores image data.

The monitor 10 includes: an input detector 11; a haptic output 12; a display controller 13; a detection function of detecting an input from an operator and a haptic output function of performing haptic feedback to the operator; in addition to an image display function as a function of performing the display of an image described above. The input detected by the detection function is operation of the display 100 by the operator.

In the monitor 10, the input detector 11 detects operation performed on the display 100 by the operator. When the input detector 11 detects an input from the operator, the haptic output 12 performs haptic feedback to the operator. The display controller 13 displays an image on a panel unit (not illustrated). Note that the input detector 11 detects the input from the operator via the panel unit on which the display controller 13 displays the image, and similarly, the haptic output 12 performs the haptic feedback via the panel unit.

The data processor 20 includes: an image information acquirer 21; a feature quantity calculator 22; and a haptic output determiner 23. The feature quantity calculator 22 and the haptic output determiner 23 constitute an output value calculator 24.

In the data processor 20, when the monitor 10 is displaying an image, the image information acquirer 21 acquires, from the data storage 30, information regarding each pixel corresponding to a range in which the input detector 11 has detected an input from the operator, among pixels constituting the image being displayed. The feature quantity calculator 22 calculates a feature quantity for determining a value of a force output by the haptic output 12 on the basis of the information acquired by the image information acquirer 21. The haptic output determiner 23 determines the haptic value output by the haptic output 12 on the basis of the feature quantity calculated by the feature quantity calculator 22 and a lookup table indicating a correspondence relationship between feature quantities and haptic output values.

Here, the panel unit will be described which displays an image by the monitor 10, detects an input from the operator, and outputs a force to the operator.

Figure 2:
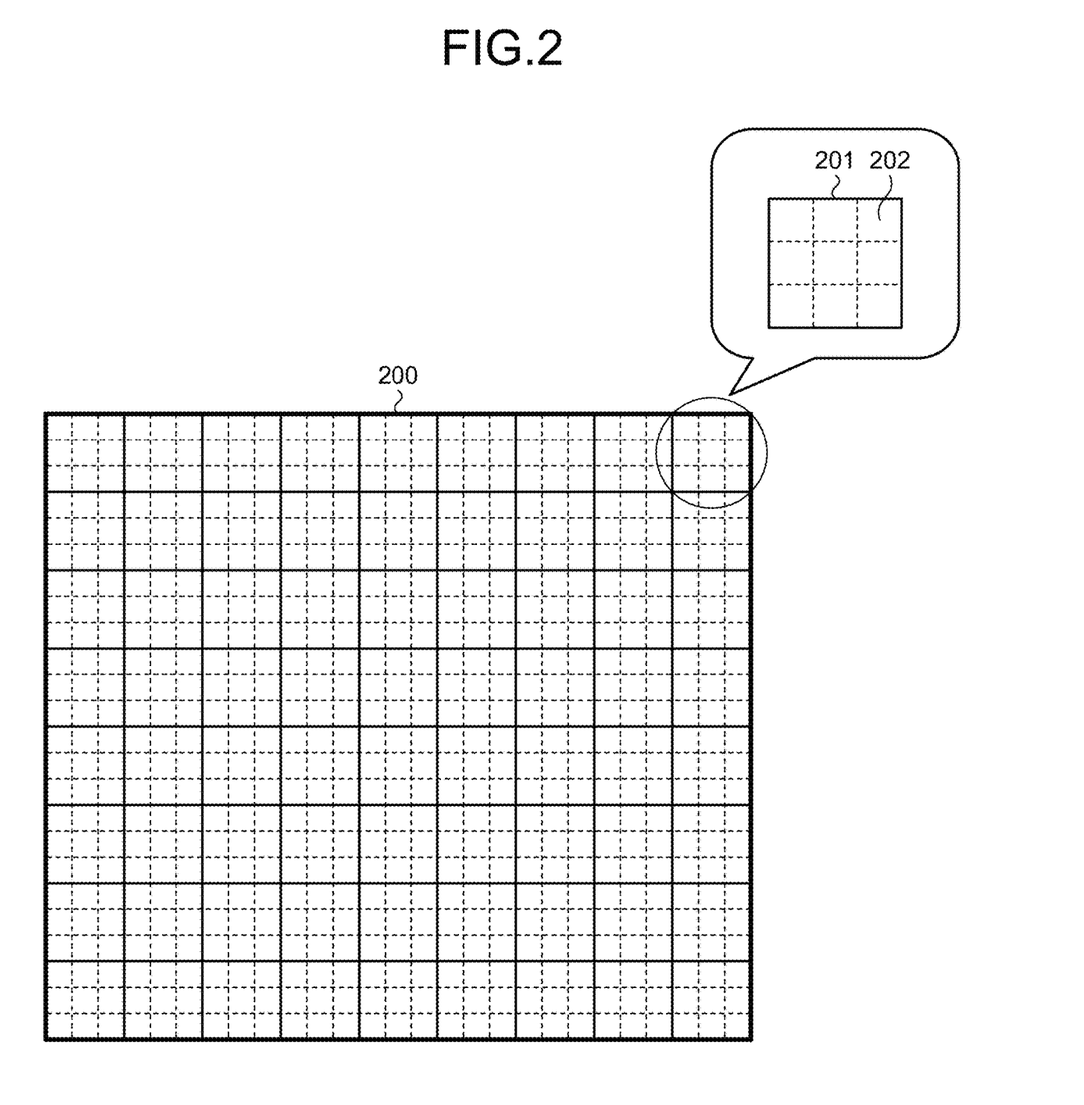
FIG. 2 is a diagram illustrating an example configuration of an input/output region of a panel unit constituting a monitor.

FIG. 2 is a diagram illustrating an example configuration of an input/output region of the panel unit constituting the monitor 10. An input/output region 200 illustrated in FIG. 2 is a region in which the monitor 10 displays an image, detects an input from the operator, and outputs a haptic value.

The input/output region 200 includes: a plurality of haptic feedback regions 201 each for performing haptic feedback to the operator; and a plurality of input detection regions 202 each for detecting an input from the operator. One haptic feedback region 201 includes a total of nine input detection regions 202, three regions in a longitudinal direction by three regions in a lateral direction. In addition, the input/output region 200 includes a total of 72 haptic feedback regions 201, eight regions in the longitudinal direction by nine regions in the lateral direction. An image is displayed on the entirety of the input/output region 200.

That is, the input/output region 200 is obtained by superimposing a first region for displaying an image, a second region including the plurality of input detection regions 202 each for detecting an input from the operator, and a third region including the plurality of haptic feedback regions 201 each for performing haptic feedback to the operator.

Figure 3:
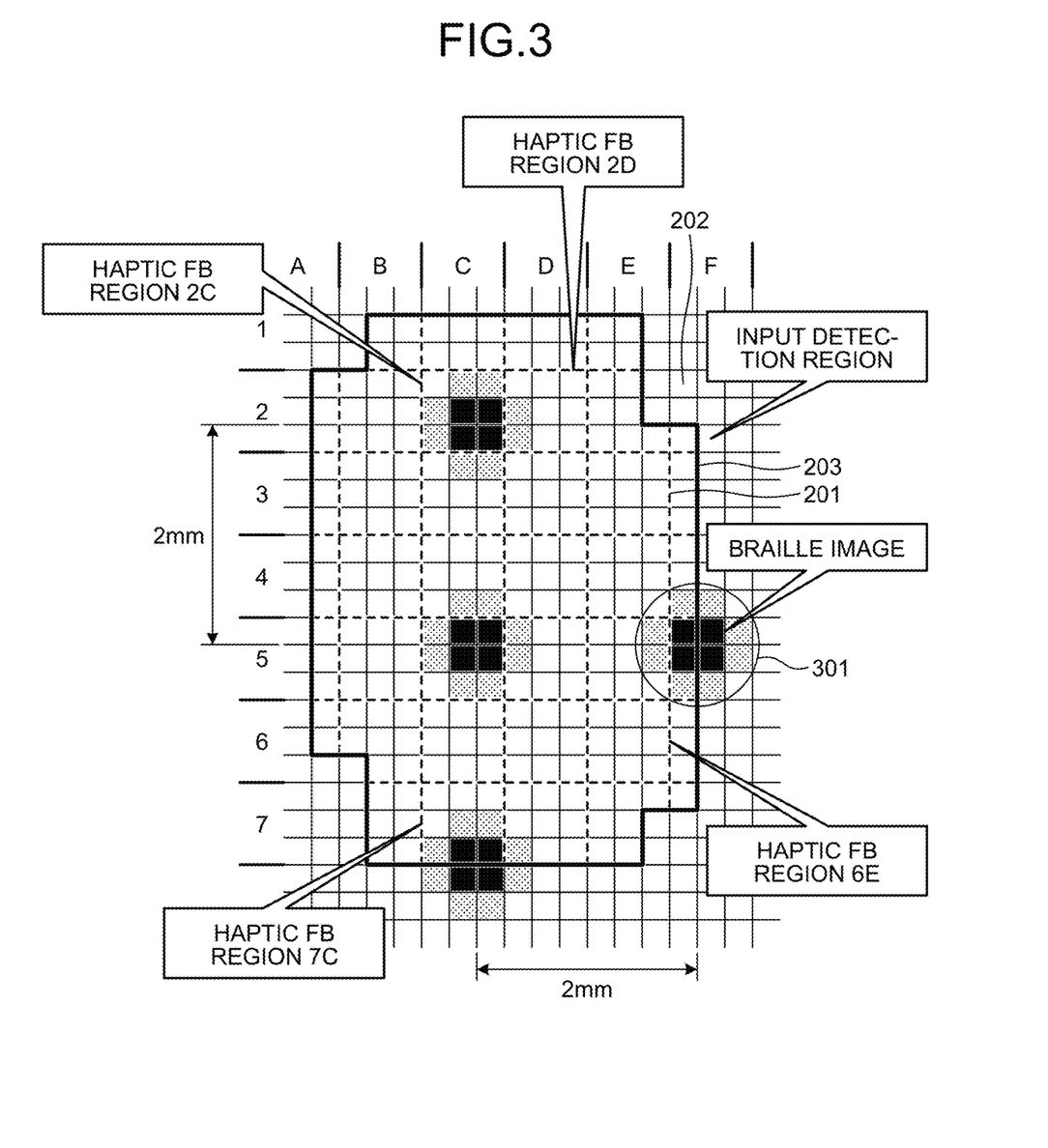
FIG. 3 is a diagram for explaining an example of an operation of the display according to the embodiment.
Figure 4:
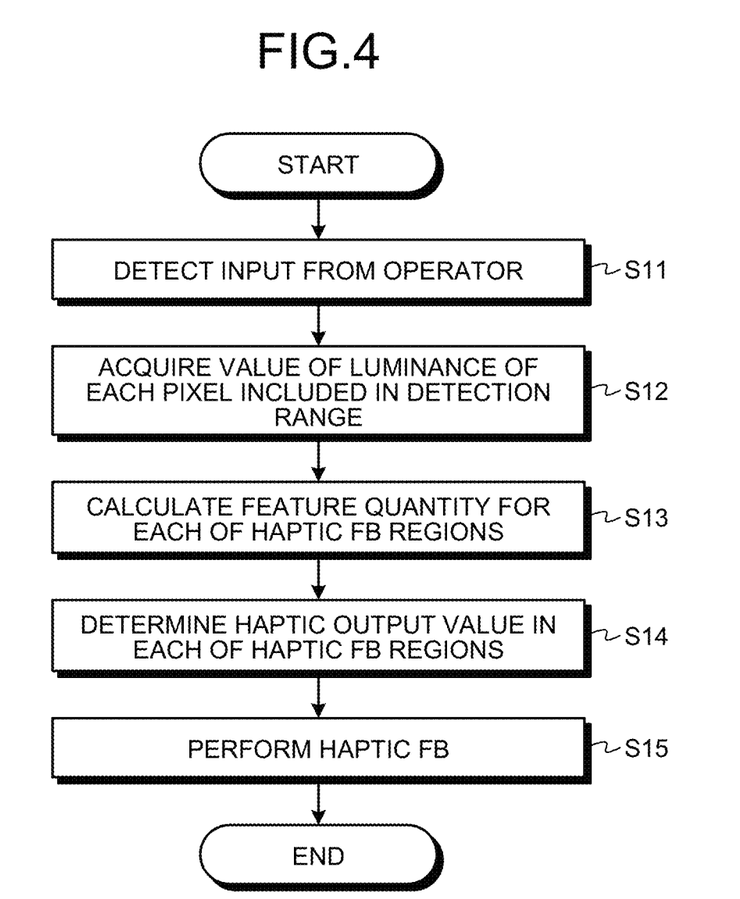
FIG. 4 is a flowchart illustrating an example of the operation of the display according to the embodiment.

Next, an operation of the display 100 according to the present embodiment will be described in detail with reference to FIGS. 3 and 4. In the present embodiment, as an example, an operation in a case where the operator touches a Braille image displayed on the input/output region 200 of the monitor 10 will be described. FIG. 3 is a diagram for explaining an example of an operation of the display 100 according to the embodiment. FIG. 4 is a flowchart illustrating an example of the operation of the display 100 according to the embodiment.

A case will be described where there is an input from the operator when the display 100 displays Braille images 301 as illustrated in FIG. 3. A plurality of Braille images 301 illustrated in FIG. 3 are monochrome and gradational. Note that, in FIG. 3, the haptic feedback region is described as a "haptic FB region". The expression "haptic FB region" may be used also in the following description. In addition, in FIG. 3, for identifying a plurality of haptic FB regions, numerals 1 to 7 are described as indices in a column direction, and characters A to F are described as indices in a row direction. In a case where a specific haptic FB region is described in the following description, the specific haptic FB region will be referred to as a haptic FB region 1A or the like using the indices. In FIG. 3, a range of the input/output region 200 touched by the operator, that is, a range formed by the input detection regions 202 in which an input from the operator has been detected is described as a detection range 203. Note that the length of one side of the haptic feedback region 201 is 0.75 mm, and the length of one side of the input detection region 202 is 0.25 mm.

When the operator touches the panel unit included in the monitor 10 of the display 100, the input detector 11 detects an input from the operator (step S11). In a case of the example illustrated in FIG. 3, the input detector 11 detects that each of the input detection regions 202 forming the detection range 203 is touched by the operator.

Next, the image information acquirer 21 acquires a value of luminance of each pixel included in the detection range 203 from the data storage 30 (step S12). That is, the image information acquirer 21 reads out image data of an image displayed by the monitor 10 from image data stored in the data storage 30, and moreover, extracts the value of the luminance of each pixel included in the detection range 203 from the read image data.

Next, the feature quantity calculator 22 calculates a feature quantity for each of the haptic feedback regions 201 (step S13). The feature quantity calculator 22 calculates the feature quantity for each of the haptic feedback regions 201, specifically for each of the haptic feedback regions 201 entirely or partially included in the detection range 203. In the case of the example illustrated in FIG. 3, the feature quantity calculator 22 calculates the feature quantity for each of the haptic FB regions 1B to 1E, 2A to 2F, 3A to 3F, 4A to 4F, 5A to 5F, 6A to 6F, and 7B to 7F.

The feature quantity calculated by the feature quantity calculator 22 is an average value of the luminance values of the pixels included in each of the haptic FB regions. However, for each of the haptic FB regions only partially included in the detection range 203, an average value is obtained using the luminance values of the pixels of the portions included in the detection range 203, that is, using the luminance values of the pixels included in the input detection regions 202 in which the input from the operator has been detected. For example, in a case of the haptic FB region 5F illustrated in FIG. 3, the input from the operator has been detected only in the input detection regions 202 in the leftmost column among the input detection regions 202 of three rows by three columns included in the haptic FB region 5F. Therefore, the feature quantity calculator 22 obtains an average value of the luminance values of the pixels included in the input detection regions 202 in the leftmost column. Specifically, the feature quantity calculator 22 obtains a total value of the luminance values of the pixels included in the input detection regions 202 in the leftmost column, and divides the total value by 9 to obtain an average value.

Next, the haptic output determiner 23 determines a haptic output value in each of the haptic feedback regions 201 (step S14). Specifically, for each of the haptic feedback regions 201 for which the feature quantity has been calculated by the feature quantity calculator 22, the haptic output determiner 23 determines the haptic output value on the basis of the feature quantity of each of the haptic feedback regions 201 and the lookup table indicating the correspondence relationship between feature quantities and haptic output values. Since the feature quantity is an average value of the luminance values, it can be said that the lookup table is a correspondence table between luminance values and haptic output values.

Next, the haptic output 12 performs haptic feedback (step S15). That is, the haptic output 12 outputs a haptic value from each of the haptic feedback regions 201 in accordance with the haptic output value in each of the haptic feedback regions 201 determined by the haptic output determiner 23.

The display 100 repeatedly executes steps S11 to S15 illustrated in FIG. 4 to detect an input from the operator and to perform haptic feedback. At that time, in a case where the range in which the input from the operator is detected in step S11 coincides with a range in which the input from the operator was detected in step S11 previously executed, the display 100 may skip steps S13 and S14 and output, from each of the haptic feedback regions 201 in step S15, a haptic value having the same value as that in the previous execution. As a result, the amount of calculation can be reduced.

Note that, in FIG. 3, one input detection region 202 and a pixel appear to have the same size, but the size of one input detection region 202 and the size of a pixel are different from each other.

Figure 5:
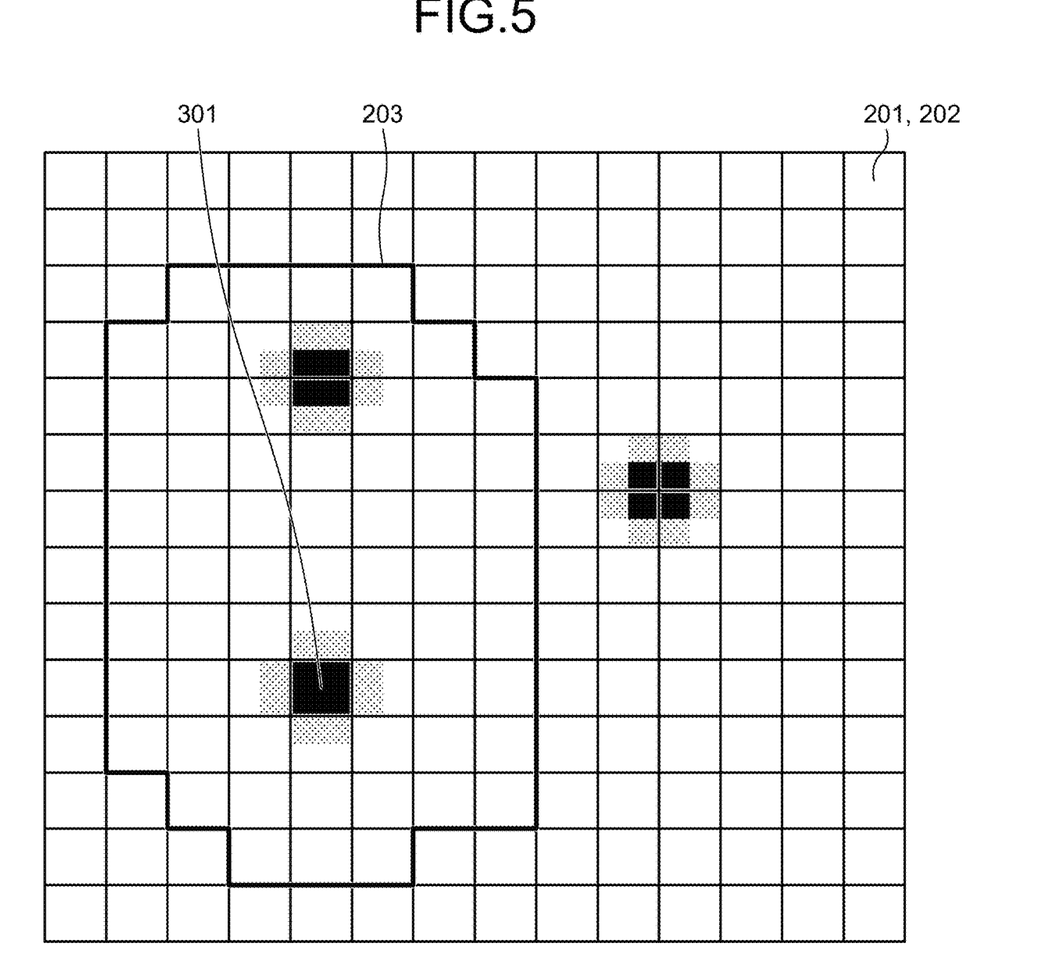
FIG. 5 is a diagram illustrating another example configuration of the input/output region of the panel unit constituting the monitor.

In the examples illustrated in FIGS. 2 and 3, the sizes of the haptic feedback region 201 and the input detection region 202 are different from each other. However, as illustrated in FIG. 5, the size of the haptic feedback region 201 and the size of the input detection region 202 may be the same. FIG. 5 is a diagram illustrating another example configuration of the input/output region of the panel unit constituting the monitor 10. In that case, when detecting an input from the operator in a certain input detection region 202, the display 100 outputs a haptic value of which a magnitude corresponds to an average value of luminance values of respective pixels included in the input detection region 202 in which the input has been detected, from the haptic feedback region 201 overlapping the input detection region 202 in which the input has been detected.

As described above, the display 100 according to the present embodiment includes the monitor 10, the data processor 20, and the data storage 30. The monitor 10 includes the pluralities of haptic feedback regions 201 and input detection regions 202 superimposed on a display region of an image. The monitor 10 detects an input from the operator, that is, a touch by the operator in each of the plurality of input detection regions 202, and outputs a haptic value from each of the haptic feedback regions 201 partially or entirely overlapping the input detection regions 202 in which the input from the operator has been detected. The data processor 20 determines a haptic value output from each of the haptic feedback regions 201 on the basis of the luminance value of each pixel included in the detection range formed by each of the input detection regions 202 in which the input from the operator has been detected. In the above example, the haptic value to be fed back to the operator is determined using the luminance of each pixel, but the value may be determined using a color. As a result, it is possible to realize haptic feedback capable of preventing erroneous recognition by the operator in a case where an image with gradation is displayed.

As a method for realizing haptic feedback, a method has been conventionally used in which an output value of a haptic value is determined for each component constituting a display screen, and a haptic value map indicating a correspondence between components and the output values is created and stored. For example, regarding each of display components such as switches and buttons to be touched by an operator, a range from which a haptic value is output when the display component is touched by the operator the and a haptic value to be output have been determined in advance. In the method, a range and an intensity of haptic feedback performed in a case where the operator touches the display component are fixed. That is, the same haptic feedback is performed regardless of which part of the display component the operator has touched. On the other hand, the display 100 according to the present embodiment distinguishes a range touched by the operator, and outputs a haptic value having a value corresponding to the luminance or color of each pixel included in the range touched by the operator, so that the haptic feedback can be performed in a shape close to an image being displayed.

Figure 6:
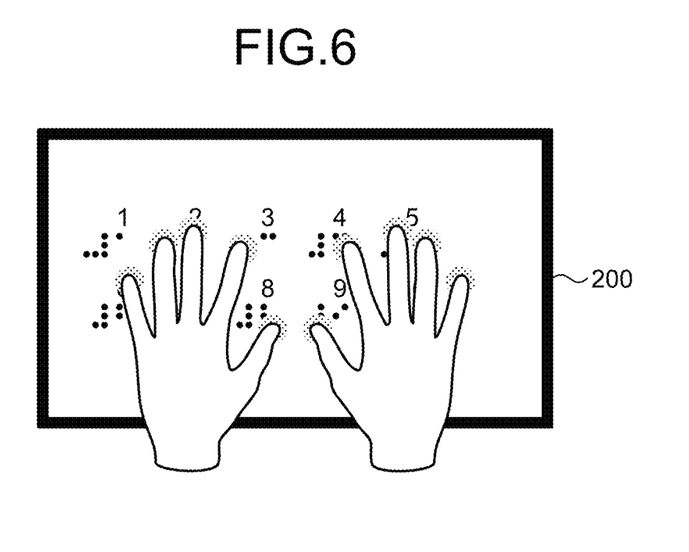
FIG. 6 is a view illustrating an example of an image in which the monitor of the display performs multi-touch detection.

In the present embodiment, the input from the operator detected by the input detector 11 of the monitor 10 is an input to one location, but simultaneous inputs to a plurality of locations as illustrated in FIG. 6 may be detectable. That is, a configuration may be employed in which the input detector 11 detects multi-touch, and the haptic output 12 outputs a haptic value from each of a plurality of locations in which the multi-touch has been detected by the input detector 11. FIG. 6 is a view illustrating an example of an image in which the monitor 10 of the display 100 performs multi-touch detection. The configuration as illustrated in FIG. 6 can be realized by an electronic circuit realizing the monitor 10, the electronic circuit including a plurality of sets of a circuit that detects an input from the operator and a circuit that outputs a force, each set of circuits performing an input detection process and a haptic value output process in parallel. As a result, the operator can perform reading through tracing with a plurality of fingers, for example.

The display controller 13 of the monitor 10 may enlarge or reduce an image being displayed in accordance with an instruction from the operator. Even in a case where the image is enlarged or reduced, the monitor 10 repeatedly executes steps S11 to S15 in FIG. 4 described above, and performs detection of an input from the operator and haptic feedback.

The display controller 13 may have a function of performing flow display of an image. That is, the display controller 13 may update an image to be displayed while shifting the image in a left-to-right direction or a top-to-bottom direction at constant intervals. Also in that case, the monitor 10 repeatedly executes steps S11 to S15 in FIG. 4 described above to detect an input from the operator, and performs haptic feedback on the basis of the luminance value of each pixel included in the range in which the input has been detected. As a result, the operator can acquire information without moving the finger, and can increase an information acquisition amount per operation area.

At that time, the output value calculator 24 including the feature quantity calculator 22 and the haptic output determiner 23 may reduce the amount of calculation by not performing a feature quantity calculation process and a haptic output value determination process in a case of a condition that it is possible to reuse a haptic output value determined once. For example, it is assumed that the image illustrated in FIG. 3 flows from right to left, and the image moves by one haptic FB region every time steps S11 to S15 in FIG. 4 are executed once. In that case, for example, regarding the haptic FB regions 2B and 2C, the output value calculator 24 can reuse a haptic output value determined for haptic feedback in the haptic FB region 2D. That is, regarding the haptic FB regions 2B and 2C, the output value calculator 24 skips the process for determining the haptic output value. Similarly, regarding each of the haptic FB regions 3B to 3D, the haptic FB regions 4B to 4D, the haptic FB regions 5B to 5D, the haptic FB regions 6C to 6D, and the haptic FB region 7C, the output value calculator 24 skips the process for determining the haptic output value.

Figure 7:
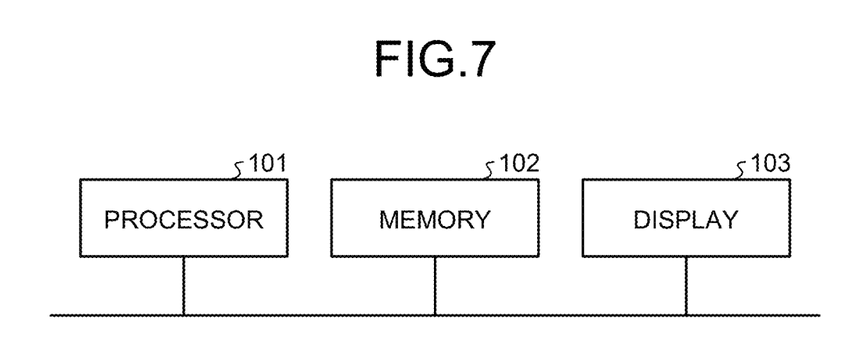
FIG. 7 is a diagram illustrating an example of hardware that realizes the display.

Next, hardware that realizes the display 100 will be described. FIG. 7 is a diagram illustrating an example of hardware that realizes the display 100. The display 100 can be realized by, for example, a processor 101, a memory 102, and a display 103 illustrated in FIG. 7.

The processor 101 is a central processing unit (CPU, also referred to as a central processing device, a processing device, an arithmetic device, a microprocessor, a microcomputer, and a digital signal processor (DSP)) or the like. The memory 102 is a random access memory (RAM), a read only memory (ROM), a flash memory, an erasable programmable read only memory (EPROM), or an electrically erasable programmable read only memory (EEPROM (registered trademark)). The display 103 includes an input detection circuit that detects an input from the operator and a force output circuit that outputs a force to the operator, in addition to a general image processing circuit included in a liquid crystal panel or the like.

The data processor 20 of the display 100 is realized by the processor 101 executing programs for operating as the image information acquirer 21, the feature quantity calculator 22, and the haptic output determiner 23 of the data processor 20. The programs for operating as the image information acquirer 21, the feature quantity calculator 22, and the haptic output determiner 23 are stored in the memory 102. The processor 101 reads out the programs from the memory 102 and executes the programs, thereby operating as the image information acquirer 21, the feature quantity calculator 22, and the haptic output determiner 23. The programs for operating as the image information acquirer 21, the feature quantity calculator 22, and the haptic output determiner 23 may be provided to a user in a state of being stored in the memory 102 in advance, or may be provided to the user in a state of being written in a storage medium such as a compact disc (CD)-ROM or a digital versatile disc (DVD)-ROM and installed in the memory 102 by the user.

The monitor 10 of the display 100 is realized by the display 103. The data storage 30 is realized by the memory 102.

The configurations described in the embodiment above are merely examples and can be combined with other known technology and part thereof can be omitted or modified without departing from the gist thereof.

REFERENCE SIGNS LIST

10 monitor; 11 input detector; 12 haptic output 13 display controller; 20 data processor; 21 20 image information acquirer; 22 feature quantity calculator; 23 haptic output determiner 24 output value calculator; 30 data storage; 100 display; 200 input/output region; 201 haptic feedback region; 202 input detection region; 203 detection range.

The invention claimed is:

1. A display apparatus comprising:
a monitor adapted to perform haptic feedback when detecting an input from an operator while an image is being displayed, the monitor including:
a first region adapted to display an image;
a second region including a plurality of input detection regions each adapted to detect an input from an operator; and
an input/output region being obtained by superimposing a third region including a plurality of haptic feedback regions each adapted to perform haptic feedback to the operator; and
a data processor circuit adapted to determine a haptic output value in each of the plurality of haptic feedback regions on a basis of:
image data of an image being displayed on the first region; and
a detection result of an input from an operator in each of the plurality of input detection regions, wherein
the data processor circuit is adapted to determine the haptic output value regarding, among the plurality of haptic feedback regions, a haptic feedback region in partial superimposition with a detection range including the input detection regions in which an input from an operator has been detected on a basis of luminance or color of each pixel included in a superimposed portion and a size of the haptic feedback region.

2. The display apparatus according to claim 1, wherein the data processor circuit includes:
an image information acquirer adapted to acquire a value of luminance or color of each pixel corresponding to a detection range including the input detection regions in which an input from an operator has been detected, among pixels constituting an image being displayed on the first region; and
an output value calculator adapted to calculate a haptic output value in each of the haptic feedback regions corresponding to the detection range on a basis of:
the values acquired by the image information acquirer; and
a correspondence table of values indicating luminance or color and the haptic output values.

3. The display apparatus according to claim 2, wherein the output value calculator includes:
a feature quantity calculator adapted to calculate, as a feature quantity, an average value of the values acquired by the image information acquirer for each of the haptic feedback regions partially or entirely included in the detection range, among the plurality of haptic feedback regions; and
a haptic output determiner adapted to determine a haptic output value in each of the haptic feedback regions corresponding to the detection range on a basis of:
a feature quantity calculated by the feature quantity calculator; and
the correspondence table.

4. The display apparatus according to claim 1, wherein the data processor circuit is adapted to repeat a process of determining the haptic output value at constant intervals.

5. The display apparatus according to claim 1, wherein the monitor includes:
an input detector adapted to detect simultaneous inputs to a plurality of locations in the second region by an operator, and
in a case where the input detector detects the simultaneous inputs, the data processor circuit is adapted to determine a haptic output value in each of haptic feedback regions, the haptic feedback regions each corresponding to one of a plurality of locations where the simultaneous inputs have been detected.

6. The display apparatus according to claim 1, wherein the monitor includes a display controller adapted:
to display an image on the first region; and to enlarge or reduce the image being displayed in accordance with operation by an operator.

7. The display apparatus according to claim 1, wherein the monitor includes a display controller adapted:

to perform flow display of an image in a horizontal direction or a vertical direction in the first region.

* * * * *